United States Patent [19]
Fujita

[11] Patent Number: 5,249,135
[45] Date of Patent: Sep. 28, 1993

[54] AUTOMATIC DESIGN PROCESSING SYSTEM FOR CREATING DESIGN PROCESSES FOR MACHINING OF PARTS

[75] Inventor: Satoru Fujita, Hyogo, Japan
[73] Assignee: Mitsubishi Denki K.K., Tokyo, Japan
[21] Appl. No.: 845,364
[22] Filed: Mar. 5, 1992

Related U.S. Application Data

[63] Continuation-in-part of Ser. No. 374,712, Jul. 3, 1989, abandoned.

[30] Foreign Application Priority Data

Jul. 4, 1988 [JP] Japan ................................ 63-166203

[51] Int. Cl.⁵ .............................................. G06F 15/46
[52] U.S. Cl. ............................ 364/474.21; 364/474.24
[58] Field of Search ...................... 364/474.21, 474.24, 364/474.22, 474.23, 474.25, 474.26, 474.27, 191, 192; 395/902, 903, 904, 906

[56] References Cited

U.S. PATENT DOCUMENTS

| | | | |
|---|---|---|---|
| 4,530,046 | 7/1985 | Munekata et al. | 364/474.21 |
| 4,667,294 | 5/1987 | Shima et al. | 364/474.21 |
| 4,680,719 | 7/1987 | Kishi et al. | 364/474.21 |
| 4,739,488 | 4/1988 | Asakura | 364/474.21 |
| 4,750,105 | 6/1988 | Ohkawa et al. | 364/474.21 |
| 4,823,255 | 4/1989 | Tanaka et al. | 364/474.21 |

OTHER PUBLICATIONS

Satoru Fujita et al. "Study of Practical Computer Aided Process Planning Based on Expert System".

*Primary Examiner*—Jerry Smith
*Assistant Examiner*—Jim Trammell
*Attorney, Agent, or Firm*—Sughrue, Mion, Zinn, Macpeak & Seas

[57] ABSTRACT

An computer-aided automatic design processing system for designing processes for the machining of parts includes a process design processing section for deciding a machining device, a machining mode, and a machining reference surface based on a parts model of parts to be machined and a data base for production, a forming and verifying section for forming and verifying a process plan based on the output of the process design section processing section, and a fixture processing section. The system is capable of performing the computer processing of a process plan and a fixture plan.

20 Claims, 9 Drawing Sheets

AUTOMATIC DESIGN PROCESSING SYSTEM FOR CREATING DESIGN PROCESSES FOR MACHINING OF PARTS

This is a continuation-in-part of application Ser. No. 07/374,712, filed Jul. 3, 1989, abandoned.

BACKGROUND OF THE INVENTION

The present invention relates to an automatic design processing system for creating machining design processes for parts.

Figure 1:
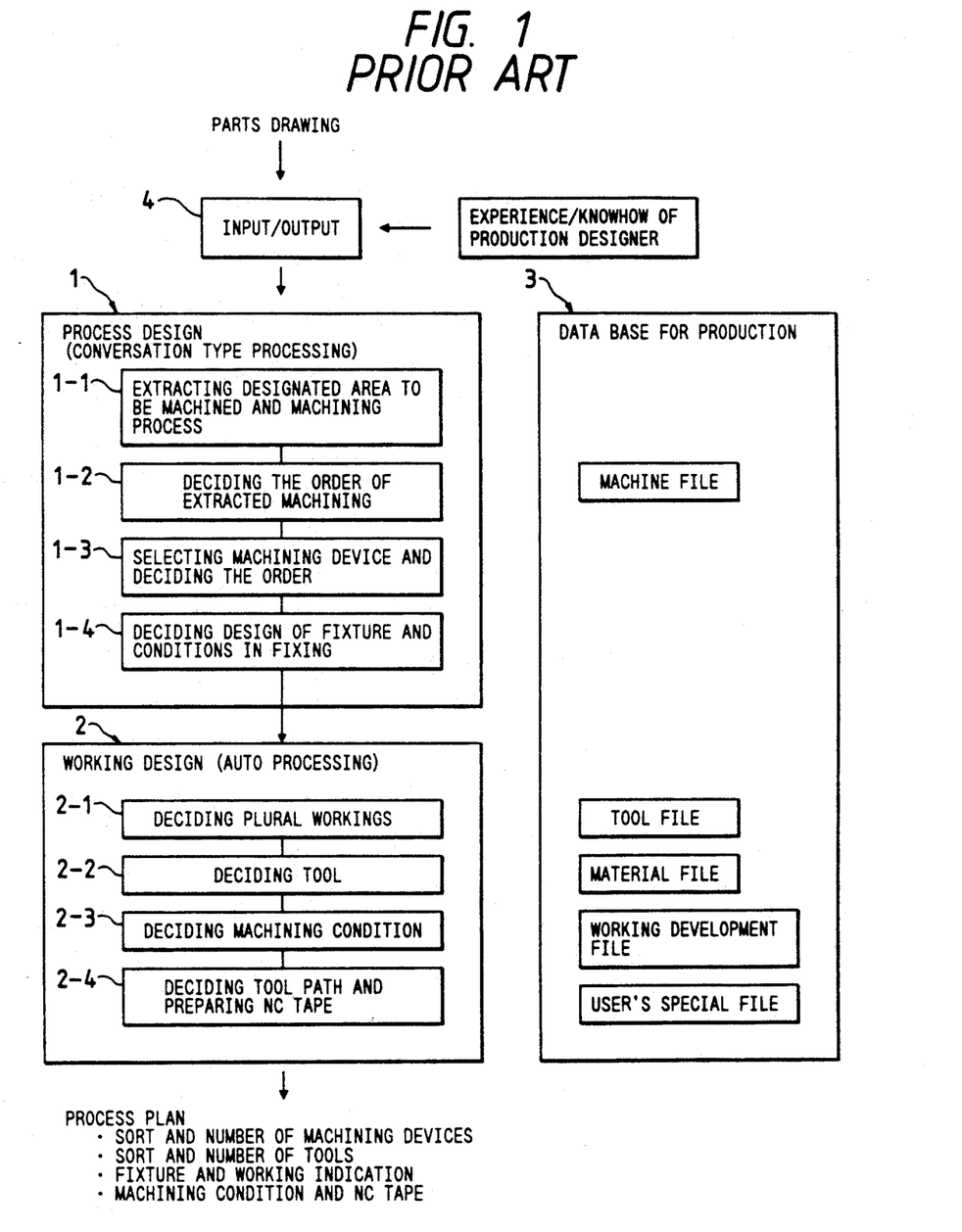
FIG. 1 is a block diagram schematically illustrating the configuration of an example of a conventional process design processing system.

There is a paper by Iwata et al. entitled "Automation of Production Design", in *The Journal of the Information Processing Society of Japan*, Vol. 124, No.1, 1983, pp. 32–40, which discloses a conventional automatic processing system for process design in machining parts. FIG. 1 is a block diagram illustrating a flow of information in a production design of machine parts, which is employed in the above-mentioned conventional automatic processing system. A system based on the conventional system will be described hereunder.

In FIG. 1, reference numeral 1 designates a conversation type process design processing section for deciding process information for machining a product (or parts) through the selection or input by a production designer. The process design processing section 1 is constituted by the following elements 1-1 to 1-4. The element 1-1 is a processing section for extracting a designated area to be machined and the parts and machining processes therefor, the element 1-2 is a processing section for deciding the order of the extracted machining processes, the element 1-3 is a processing section for selecting machining devices for performing the assigned machining processes and deciding the order of use of the selected machining device, and the element 1-4 is a processing section for deciding a design of a fixture or holder required for fixing the attitude of a (intermediate) blank decided for every process and for deciding conditions (working instructions) in the fixing operation.

In FIG. 1, reference numeral 2 designates a working design processing section for automatically processing a working plan for specific operations of the machining process on the basis of the result of a process plan of the above-mentioned process design processing section I. The working design processing section 2 is constituted by elements 2-1 to 2-4 as follows. The element 2-1 is a processing section for deciding specific machining operations and the order thereof for the machining processes allocated to every process, the element 2-2 is a processing section for selecting a tool to be used in every machining operation, the element 2-3 is a processing section for deciding machining conditions such as a cutting speed, a feeding speed, a cutting depth and so on in every machining operation, and the element 2-4 is a processing section for obtaining a desired path of a tool in every machining operation, and for producing an NC tape for realizing the machining.

In FIG. 1, the reference number 3 designates a data base to be referenced in automatically deciding and supporting a machining operation, in which a machine file, a tool file, a working development file, a material file and so on are prepared. In FIG. 1, reference numeral 4 designates a display portion for graphically displaying the shape of parts or a blank, and for displaying a menu provided for allowing an operator to execute input or selection choices found on the menu, for example.

Next, the operation of the system having the above-mentioned configuration will be described. Information about parts to be machined is inputted, for example, in the form of an image of a parts drawing from a higher ranking computer-aided design (CAD) system and the thus inputted information is displayed by the display portion 4. The information in the drawing includes the shape and precision or accuracy (surface roughness, size tolerance, degree of perpendicularity, and so on) required by the parts, and so on. Although this raw information can be understood by a production designer, a computer cannot understand the meaning of the raw information and regards the raw information merely as points, lines and characters. In the step of the process design 1, the production designer himself extracts areas to be machined and machining processes from the displayed parts information on the basis of his experience (1-1).

In the decision 1-2 of machining processes, the allocation of machining tools thereto, the order of the machining processes, and areas to be machined are indicated by hitting the corresponding portions of the shape of the parts displayed on the graphic display, and machining processes of the areas to be machined are selected from a menu having a turning process, a milling process, a drilling process, or the like, so that the machining processes and the order thereof are inputted. The machining devices or tools to be used in the respective machining processes are inputted by selecting the numbers in a number menu of the machining devices 1-3. Next, roughly considering the attitude or spatial disposition of a blank, the areas to be machined and tool paths for every process, the kind and disposition of a fixture in the process is decided (1-4).

The step of the working design 2 is performed somewhat automatically as follows. A plurality of workings or operations required for an area to be machined are decided by use of a working know-how file, for example, (201). The working know-how file is searched on the basis of the name of the area to be machined and accuracy information, for example, to develop a desired working operation. The "working know-how" means the development of a specific working or machining operation, such as "rough machining → intermediate finish machining → finish machining → chamfering" in a boring machining, "center hole drilling → drilling → chamfering → tapping" in a tap machining, and so on.

Next, tools and machining conditions are decided with reference to a "data base file" which is provided in advance as know-how for machining. Preferred tools are selected by searching a "tool file" in view of the points of a machine, a machining method, shape data, accuracy data, and so on (2-2). Machining conditions such as cutting speed, feeding speed and so on are decided by searching a "material file", a "machine file" and so on in view of the points of characteristics of a machining method, a material and a tool (2-3).

Finally, a numerical control (NC) tape for controlling a tool path is produced by referring to a shape, a tool, a machining operation and so on for every operation (2-4). This tool path is indicated on a graphic display, so that an operator can check the appropriateness thereof.

If a problem occurs in the check of the tool path or in any other step, the operator goes back to the preceding step to perform the processing again.

In the conventional process design processing system as has been described, working designs other than a simple one are decided depending on the experience and know-how of a production designer. Accordingly, if the production designer makes a wrong judgement in a processing step, a problem occurs in that a fixing or working plan succeeding the processing step is in vain.

Although a process plan is decided based on the characteristics of machining devices or fixtures, the machining accuracy of parts being machined in the operations, and machining know-how, the decision has not been automated in the conventional system. Although data bases such as a working development file are structured to automate a working design, the automation has been limited to simple drilling and processing other than a tolerance processing, and the automation level has been too low to make a computer perform the entire tolerance processing and so on. On the other hand, since it becomes possible to perform several processes of a conventional machine tool by a single operation by using a combined machine tool such as a horizontal machining center or a turning center, high-accuracy and high-efficiency machining are achievable. However, a process design for a combined machine tool having a high degree of freedom is very difficult, and there has been another problem that a conventional process design processing system which depends on the experience or know-how of a production designer in deciding a process design other than a simple one cannot cope with such a difficult process design.

SUMMARY OF THE INVENTION

In view of the above, an object of the present invention is to solve the foregoing problems, and to establish a process design processing system in which a fitting plan can be made, tolerance information can be processed, a working design taking into account restriction conditions (hereinafter referred to as a "machining mode") between surfaces to be machined can be made, a process plan can be made automatically based on the thus obtained information as to a machining attitude, a machining mode and a parts model, and the possibility of machining of parts is verified under those restrictive conditions, thereby obtaining a process plan.

It is another object of the present invention to provide a process design processing system for a process design system, which can be applied to a combined machine tool or a large-kind and small-quantity production system.

The above, and other objects of the present invention are provided by a process design processing system for machining comprising an input portion or section for a parts model constituted by a shape, machining shape elements (e.g., a pocket, a face, a hole, a groove, or the like) and accuracy; a machine tool selecting processing portion section, a machining mode deciding portion or section for deciding restrictive conditions (a machining mode) between areas to be machined in machining based on a machine tool data base and information of parts accuracy; a reference surface deciding portion o section for deciding a machining reference surface based on the parts model; and a process plan forming-/verifying portion or section; wherein the parts accuracy is processed by a computer to decide a fixture plan and to obtain a process plan.

In the machining mode deciding section, information as to parts accuracy such as tolerance and so on is computer-processed and converted into a machining mode in machining, and in the process plan forming/verifying portion, a process plan is formed on the assumption of a machining attitude based on a machining reference surface and so on decided in the preceding processing steps, and it is judged whether all the areas to be machined can be machined in the state of satisfying the machining mode in view of the tool direction in machining to thereby computer-process a process design including a fixture plan.

DESCRIPTION OF THE PREFERRED EMBODIMENTS

Figure 2:
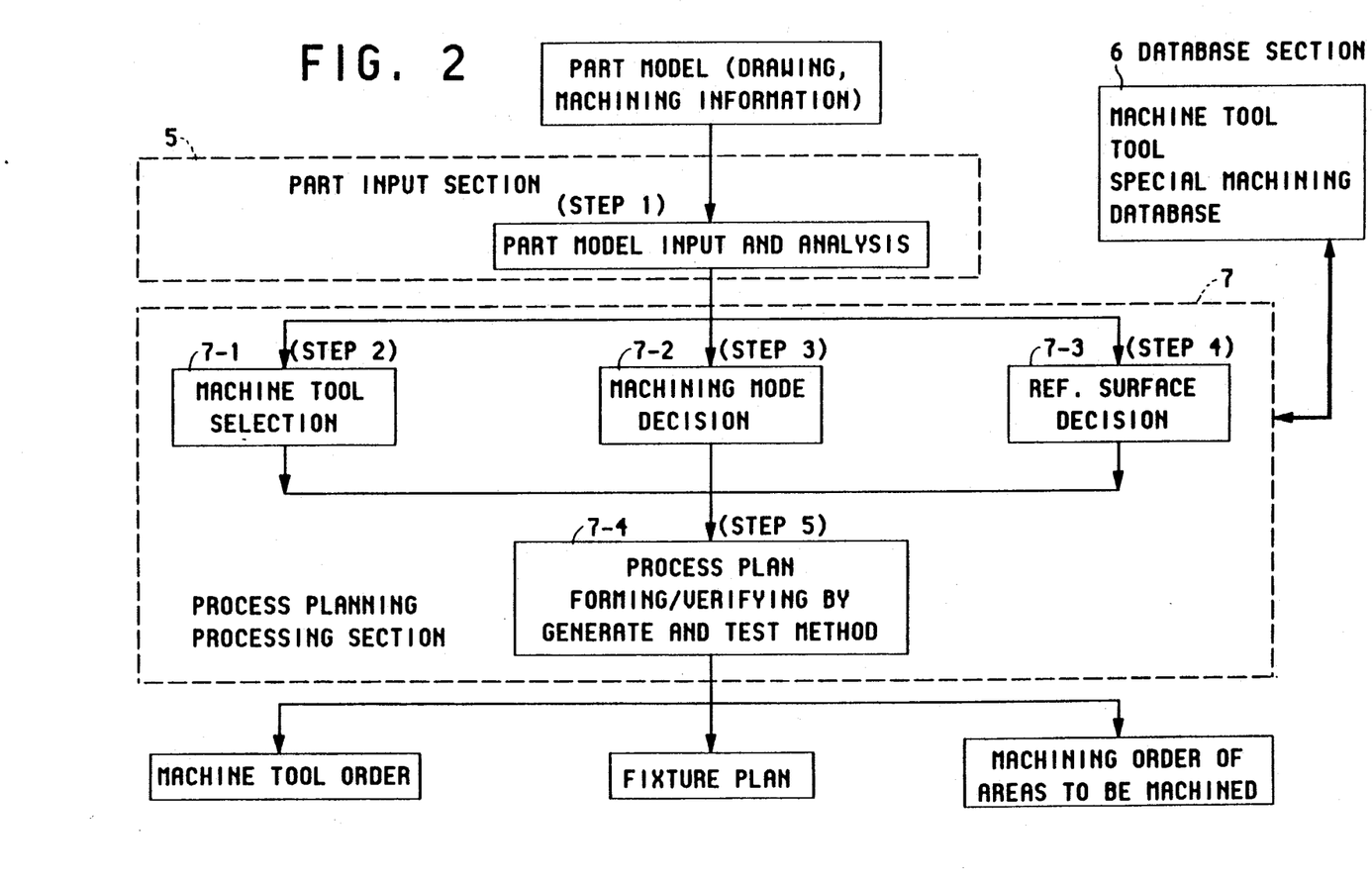
FIG. 2 is a block diagram schematically illustrating the configuration of a process design processing system as an embodiment of the present invention.

An embodiment of the present invention will be described with reference to FIGS. 2, 3, and 4. In FIG. 2, reference numeral 5 designates a parts input portion or section for inputting a parts model. In this case, the parts model is defined by shape information and machining technique information. The machining technique information is constituted by accuracy information and machining shape features such as a pocket, a face, a hole, or the like, as shown in FIG. 4. The parts model is summarized in the following table.

TABLE

| | Parts Model | |
|---|---|---|
| SHAPE | | Face, Edge, Point |
| MACHINING | Area I | Open face, Face |
| SHAPE | Area II | Pocket, Pocket mountain (island) |
| FEATURES | Others | Hole, Groove, Step |
| ACCURACY | Local | Surface roughness, Degree of flatness |
| | Global | Tolerance of dimension, Degree of perpendicularity, Degree of parallelization, Degree of concentricity, Degree of coaxiality |

Reference number 6 designates a data base section for a machining device, machining tools, special machining and so on. Thus, database 6 is a database for manufacturing machines, such as machine tools, fixtures, and other tools. "Fixtures" are mechanical devices to hold a workpiece on the X-Y table of a machine tool. These fixtures may contain a "base", a "clamping device", a "reference pin", and so on. Reference numeral 7 designates a process planning processing portion or section for processing the knowledge about a process design based on the parts model and the data base for machines to thereby obtain a process planning. The process design processing section is constituted by elements 7-1 to 7-4 as follows.

The element 7-1 is a machine or device selecting section for selecting a machine tool to be used based on the schematic shape of parts and the data base for machining devices. The element 7-3 is a reference surface deciding section for deciding a machining reference surface in view of the knowledge of a reference surface for machining based on the parts model. The element 7-3 is a machining mode deciding section for deciding a machining mode for an area to be machined based on the parts model and the data base for the selected machining device. The element 7-4 is a process plan forming/verifying section for forming a process plan based on the information decided by the above-mentioned processing sections, and verifying the formed process plan by, for example, the generate-and-test method.

Next, an operation of the embodiment will be described. A parts model as the information of parts to be machined is supplied to a computer through processing of a drawing fed from a higher rank CAD system by an input processing section. As shown in the above table, the parts model is constituted by shape information and machining technique information composed of machining shape elements and accuracy.

The processing sequence according to the present invention will be described with reference to FIG. 3. First, in step 3, a parts model is understood, and, step 2, a most economical and suitable machine tool for machining parts is selected based on, for example, the information as to a table size and stroke range of the machine in the data base for machine tools, the information as to the schematic shape of the parts and the machining shape elements which are registered in advance. If no tool is found, the operation terminates. If a tool is found, the operation continues to step 3.

In step 3 a machining mode of an area to be machined, the tolerance of which is assigned, is decided based on the information as to the designated tolerance of the parts and based on the accuracy of the machine tool.

The above-mentioned machining mode will be described when, for example, a horizontal machining center has been selected. From the point of accuracy, the following four machining modes can be made to correspond to areas to be machined in accordance with the strictness of tolerance required.

1. In a finish machining, two areas to be machined, the tolerance of which is assigned, are machined under the conditions of the same fitting attitude and the same index table angle.
2. In a finish machining, two areas to be machined, the tolerance of which is assigned, are machined under the conditions of the same fitting attitude.
3. Although a finish machining is necessary, there is no restriction in machining.
4. No finish machining is necessary.

With the above-described machining modes, it is possible to process, by means of a computer, an upper limit of static (e.g., one-axis movement) or dynamic (e.g., more than one-axis movement) accuracy of a machine tool, and a tolerance range designated for an area to be machined of the parts.

The four machining modes allow a range of static and dynamic accuracies of a machine tool to be selected according to the degree of tolerance or precision required of the parts being machined. The term "static" and "dynamic" accuracy of a machine tool indicate, respectively, the accuracy of one-axis movement, and accuracy of a combined movement in two or three axes, as mentioned above.

Further, as mentioned above, the machining modes are determined, comparing the tolerance of the part with accuracy of the machine tools. The accuracy of the machine tools are defined according to the kinds of tolerance, the rotation of the index table, and the setup. The values of accuracy of the machine tools are measured by the test machining, and then stored in the database.

The designed selects the desired tolerance of the parts and the computer processes this tolerance. Furthermore, the invention produces a setup plan by experiential or empirical rules to realize desired accuracy of a part model with a proprietary machine tool, such as a horizontal machining center. The rules are focused on treatment of various tolerances of the part and accuracy of the machine tools.

More specifically, a designer specifies the desired tolerances of the part in the engineering drawings. The present invention treats various tolerances of the pat to machine the part, based on the tolerance and accuracy of the machine tools. Thus, "tolerance" indicates that the range of tolerance and the spatial relationship between the two surfaces, such as parallel, right-angle, and distance, are taken into consideration. The expert system determines the machining modes, comparing tolerance of the part with accuracy of a machine tool, and also generates the tests the possible process plans, by taking into consecration the tolerance.

Next, in step 4, a machining reference surface for positioning parts on a table of a horizontal cutting machine, for example, is described as a surface having an area more than a certain extent and superior in a completed machining state based on the information of a parts model. On the other hand, a tolerance reference surface as a position and centering reference of the parts is decided for every machining reference surface based on the knowledge of machining by which it is possible to guarantee accuracy and dispose fixtures. The term "reference surface" indicates a surface on a table of a horizontal cutting machine, for example, for setting parts. In the embodiment of the invention, two reference surfaces are present. One is a "base-reference-face" which is installed against X-Y table of a machine tool, so that the workpiece can be held against the machine tool using the fixture devices. The other is a "locate-reference-face" which is installed against a locate pin, so that one surface can be positioned to another surface. The tolerance reference surface is a predetermined position, within a given and acceptable position error range, on a reference surface of a cutting machine which enables the process to determine the accuracy and position of the blanks and cutting machine parts.

Thus, a machining device to be used for machining, an attitude to be taken during machining by the machining device, a group of the areas to be machined in only a rough machining mode, a group of areas to be machined in both rough and finish machining modes, and machining modes for the respective areas to be machined, have been decided. In this step, since there are some cases in which a plurality of machining attitudes (attitudes of a blank relative to a machining device during machining) are obtained, a plurality of process plans are formed based on the above-mentioned results.

Each of the process in a finish process plans is verified in step 5. Thereafter, as shown in FIG. 3, a fixture plan in the finish process is incorporated into each of the process plans. Specifically, a fixture plan is designed for the finish machining process, and the machining order is decided with the fixture plan in the finish machining process. If all machining regions cannot be machined, the process returns to step 2, and the above-described steps are performed again for another machine tool. Alternatively, if all the machining regions can be machined the process continues. Thereafter, the capability of machining in a rough machining process is verified, and a fixture plan is developed for the rough machining process. The machining order is decided with the fixture plan for the rough machining process. At this point, it is determined whether all machining regions can be machined. If all machining regions cannot be machined, the operation returns to step 2, and the above-described steps are performed again, as shown in FIG. 3. If all the machining regions can be machined the process working plan is optimized, and the sequence of processing for the automatic design processing system for creating design processes for parts machining is completed.

The function of element 7 is processed by an expert system. In greater detail, and referring to FIGS. 2-4, the steps of elements 5 and 7-1 through 7-4 in a typical sequence are as follows.

--- step 1>    A part model of a part to be machined is defined in element 5. The presentation of the part model consists of the part figure, a machining feature, and accuracy as shown in the Table above. The part figure is generated using a solid modeller, and the others are defined interactively.

step 2>    A candidate machine tool is selected, comparing the workpiece size with the table size and the stroke of the machine tool. This data is stored in the part model and the machine tools of element 7, respectively.

if ((table_size of x_direc of machine-X) > (size_x of workpiece))
AND ((table_size of Y_direc of machine-X) > (size_y of workpiece)) AND ((stroke of z_direc of machine-X) > (size_z of work))
then (machine-X is a candidate for the machine tool)

step 3>    "Machining mode" is determined, comparing tolerance of the part with accuracy of the machine tool as mentioned above. The part model and the accuracy of the candidate machine tool are accessed, when the expert system reasons using the following production rule. The machining modes R&FF, R&F, and R are also determined in like manner.

if (sm_ind_ang_min of dimen_preci of Machine is X1)
AND
    (sm_ind_ang_max of dimen_preci of Machine is X2) AND
    (dimension tolerance between F1 and F2 is Y) AND
    (X1 < Y) AND
    (X2 >= Y AND
then (F1 has R&SFF with F2)
    (F2 has R&SFF with F1)

step 4>    All pairs of the reference faces are determined. One reference face is a "base-reference-face", which is installed against the X-Y table of the machine tool. The other reference face is a "locate-reference-face", which is installed against a locating pin. The base-reference-face must allow the workpiece to be kept stable when the workpiece is held on the X-Y table of the machine tool. Thus, the base-reference-face should have a larger area than other surfaces. The locate-reference-face must allow tolerance of the surfaces to be realized after machining. Therefore, the locate-reference-face should be sufficiently precise and have a right-angle relation with the base-reference-face.
The expert system determines pairs of the reference faces, by reasoning using the following rules.

if (F1 is one of surfaces to be machined) AND

---

-continued (Area of F1 is greater than 0.25 (maximum of area of workpiece)) AND
(roughness of F1 >= 1)
then (F1 is base-reference-face)
if (F2 is one of surfaces to be machined) AND
    (F2 has a right-angle relation with F1) AND
    (roughness of F2 >= 2) AND
    (Locating pins can be installed against F2)
then (F2 is locate-reference-face of F1)
     step 5>    As an example, in the case of a prismatic part using a horizontal machining center, the horizontal machining center takes less than four setups to machine all surfaces of the prismatic part. Two setups out of four are assigned to rough machining. The others are assigned to finishing machining.

---

The expert system decides possible process plans by a generate-and-test method.

(1) It generates the possible process plans. In computer processing, the process plans are determined considering all combinations of the base-reference-faces.

The combinations are an assumption about the machining attitude (or workpiece orientation) from the first setup to the fourth setup.

(2) Then, the system tests whether all machining surfaces specified in the part model can be machined from the first to the fourth setup. If all machining surfaces can be machined and part accuracy can be satisfied, the expert system concludes that the process plan is a possible solution.

The rules of step 5 are described, according to tolerance and the machining modes.

In the actual production rules, the expert system assumes that the tool rotates around the workpiece, instead of the workpiece rotating around the index axis. A direction of the surfaces is defined as outside the part and a normal vector direction.

The following rule is an example of a dimension tolerance in the R&SFF mode.

--- if (tool direction isn't the same direction as F1) AND
    (tool direction isn't the same direction as F2) AND
    (direction of base-reference-face isn't the same as F1) AND
    (direction of base reference-face isn't the same as F2) AND
    (In the case that F1 is a hole, tool direction is the same as F1) AND
    (In the case that F2 is a hole, tool direction is the same as F2))
then (F1 and F2 are machined).

---

Thus, as discussed above, the part model is input and analysis of the part model in performed (step 1). Thereafter, the sequence of steps moves to the process planning processing section 7. The function of section 7 is processed by an expert system. In step 2, element 7-1 selects a machine tool to be used based on the schematic shape of parts (based on the parts model inputted earlier) to be machined and the database for machining tools stored in database section 6. Hence, a machine tool is selected based on the parts model and the shape thereof inputted at section 5 and on the data stored within database 6. In step 3, element 7-2 decides a machining mode (e.g., rough or finish machining) for an area to be machined based on the parts model inputted into selection 5 and the data for the selected machining tool stored in database section 6. In step 4, element 7-3 decides a machining reference surface based on the parts model input into section 5. In step 5, element 7-4 forms a process plan based on the information decided by the above-mentioned processing sections and verifies the process plan which has been formed by the generate-and-test method.

At the conclusion of the verification operation by element 7-4 (e.g., when element 7-4 confirms that the process plan can be performed for the part to be machined), the process plan development is completed, and the machining tool order, the fixture plan, and the machining order of areas to be machined are determined.

Figure 3:
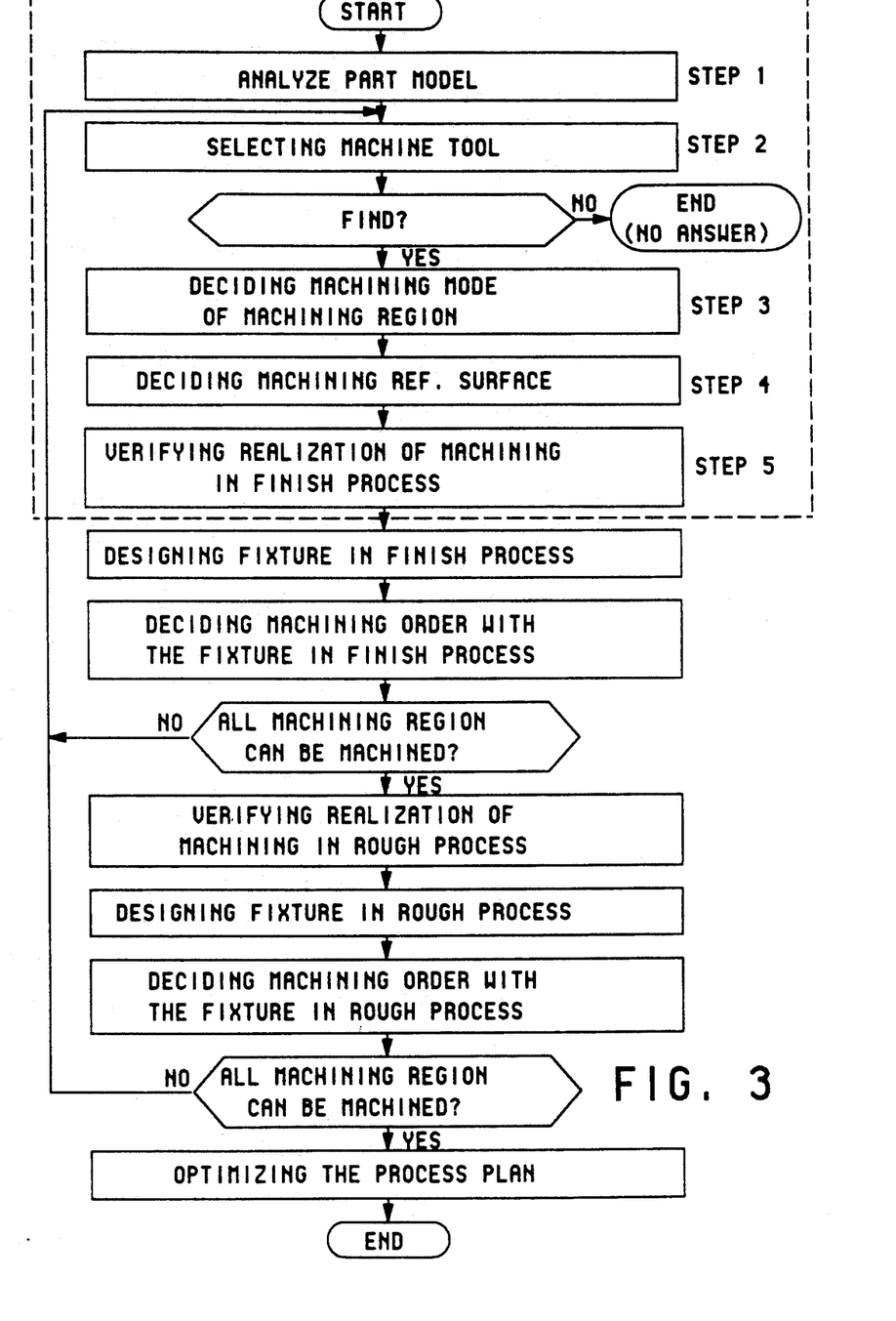
FIG. 3 is a flowchart illustrating a sequence of processing steps in the above-mentioned process design processing system.
Figure 4:
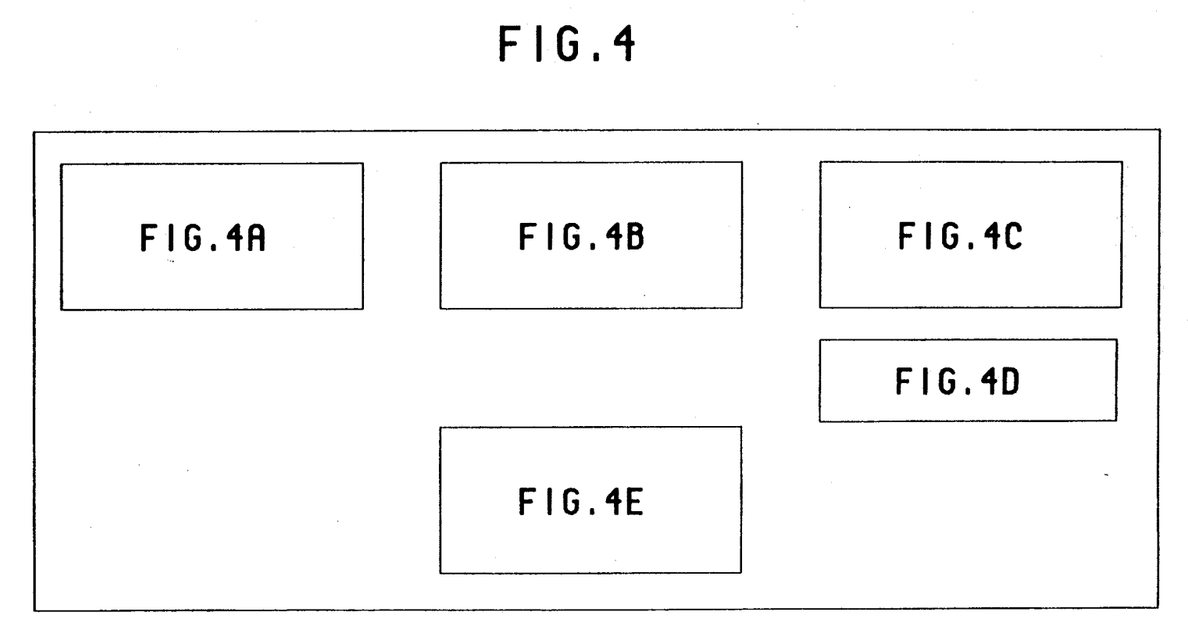
FIG. 4 is a block diagram similar to FIG. 2 schematically illustrating the configuration of the process design processing system, and specifically a part model, an equipment database and a process planning activity (production rule) in greater detail.
Figure 4A:
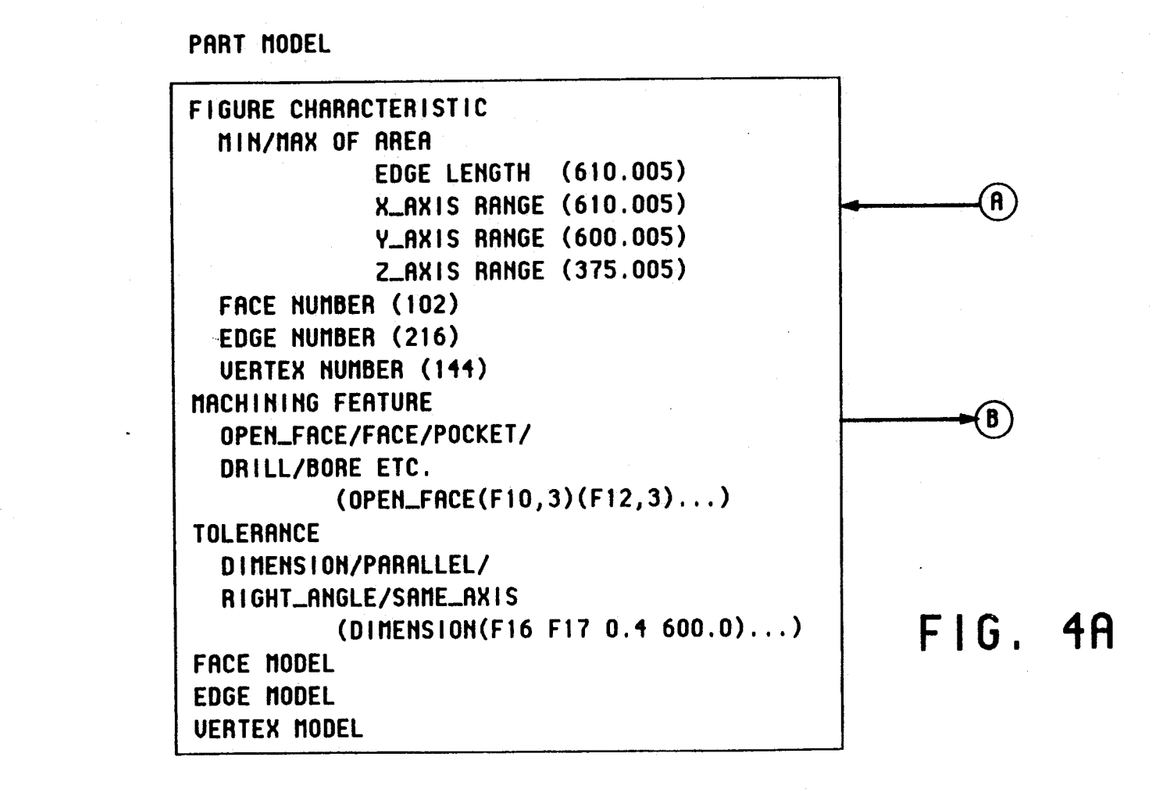
Figure 4B:
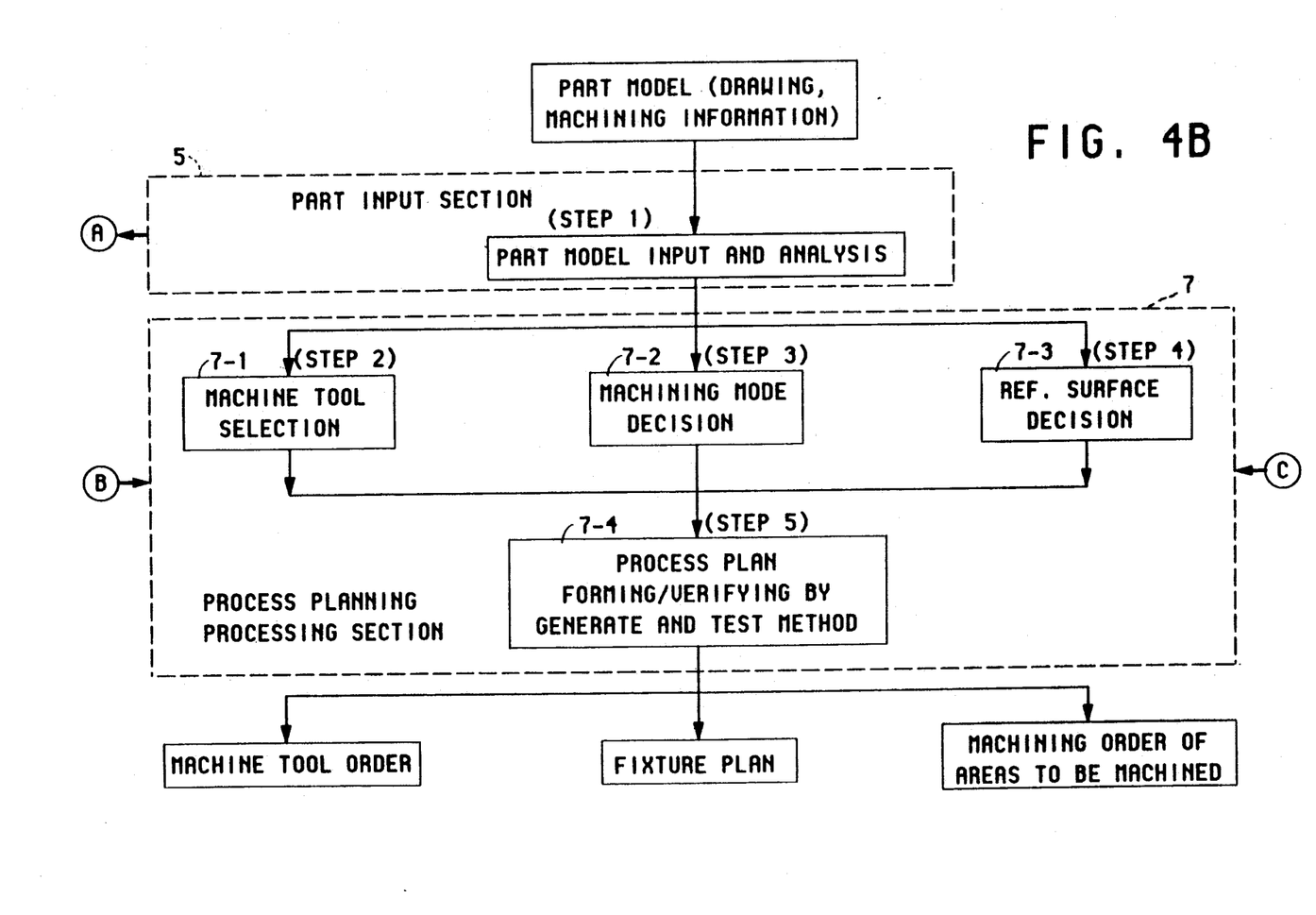
Figure 4C:
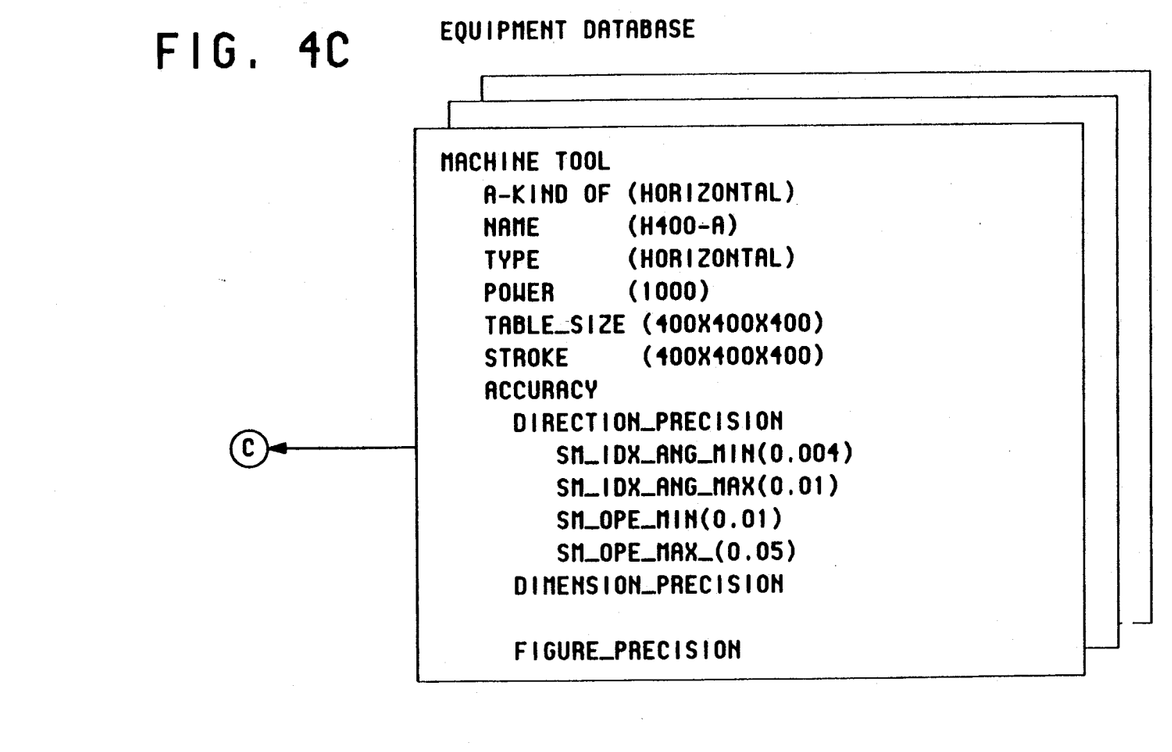
Figure 4D:
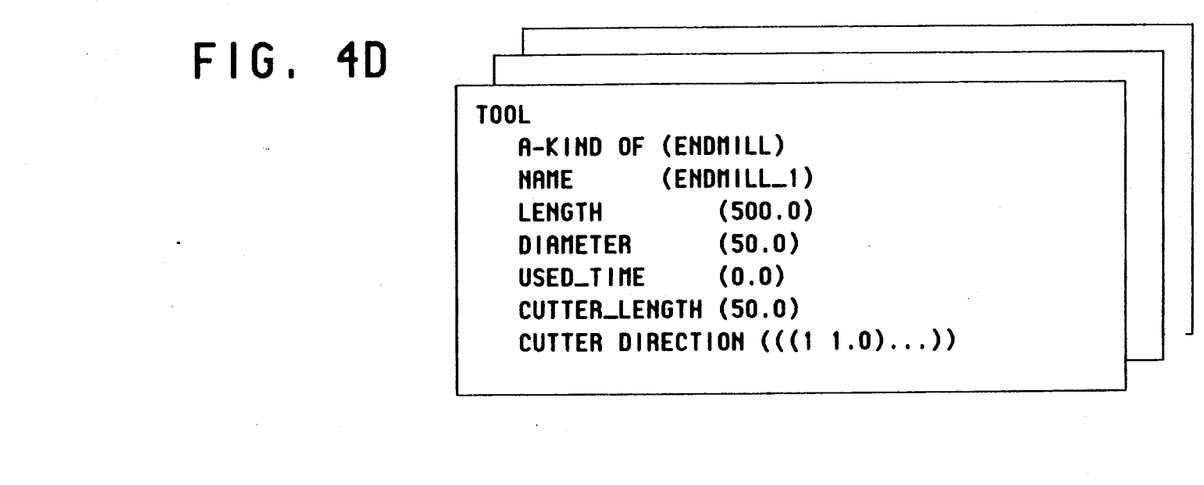
Figure 4E:
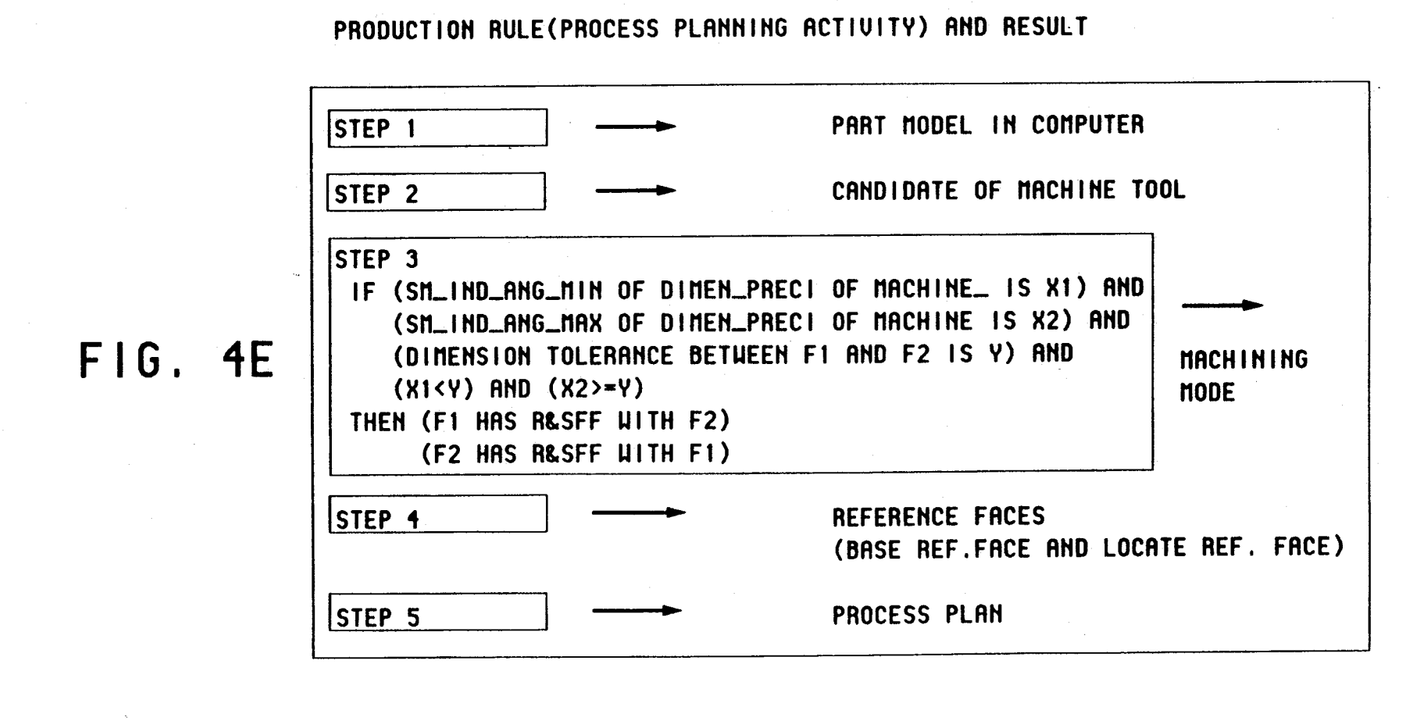

Additionally, after verifying the capability of machining (e.g., finish) in a rough machining mode, as shown in FIG. 3, a fixture plan is designed, for use with the process plan, and a machining order with a fixture taken into consideration is developed in the finish machining operation. Thereafter, the capability of the machining mode in a rough machining process step is verified, a fixture (e.g., mechanical device to hold the workpiece or blank on an X-Y table of a machining center) is designated for the rough machining operation, and the machining order is decided with the fixture taken into consideration in the rough machining process. Finally, the process working plan is optimized, and the sequence of events is completed.

A suitable machine for machining parts is selected based on the information as to table size and stroke range of a machine in the data base for machine tools, the data as to the schematic shape of the parts (and thus the job which is to be performed to fabricate the shape), and the machining shape elements which are prestored in the data base. As mentioned above, a candidate machine tool is selected in step 2. However, a suitable/optimal machine tool is not determined until an expert system generates and tests the process plans.

Regarding the selection of a machining mode (e.g., as shown in FIG. 3), this is determined based on the information as to a designated tolerance of the parts being machined and on the accuracy of the machine tool. All surfaces to be machined are given a rough/finishing machining attribute, corresponding to the roughness and tolerance thereof. If the surface has a strict roughness or tolerance, the surface must be finish-machined after rough machining. The finish machining operation achieves the part tolerance, while the rough machining operation minimizes machining time.

Four machining modes allow a range of accuracies of a machine tool to be selected according to the degree of tolerance or precision required of the parts being machined. The machining modes are determined by comparing the tolerance of the part with accuracy of the machine tools. The accuracy of the machine tools is defined according to the kinds of tolerance, the rotation of the index table, and the setup. The values of accuracy of the machine tools are measured by the test machining, and then stored in the data base. The tolerance of the parts to be machined is selected by the designer and the computer processes this tolerance. Thus, the invention produces a setup plan by empirical rules to realize desired accuracy of a part model with a machine tool, such as a horizontal machining center, discussed in the application. The rules focus on various parts tolerances and accuracy of the machine tools.

More specifically, a designer specifies the desired tolerances of the part in the engineering drawings. The present invention treats various tolerances of the desired part to thereby machine the workpiece, based on the tolerance and accuracy of the machine tools. The expert system determines the machining modes, comparing parts tolerance with accuracy of a machine tool, and also generates and tests the possible process plans, by taking into consideration the tolerance.

Inherent in the setup operation, a reference surface (e.g., a surface on a table of a horizontal cutting machine) has parts positioned thereon. The tolerance reference surface is a predetermined position, with a given and acceptable position error range, on a reference surface of a cutting machine which enables the process to determine the accuracy and position of the blanks and cutting machine parts.

Hereinunder, a description is provided assuming that a horizontal machining center is selected. Capability of machining parts means there exists a process plan capable of realizing accuracy information assigned to the parts. Through the above-mentioned processing, since the accuracy information has been converted into a machining mode in a selected machining device, the above-mentioned possibility resolves itself into the proof of existence of a process plan satisfying the machining mode.

In the case of a horizontal machining center, since it is possible to control the angle of an index table of the horizontal machining center, the direction of a selected tool corresponds to the index angle assuming that the tool is fixed. Assuming that the tool is movable, first, the direction to be taken by the tool is decided based on the reference surface of the formed process plan and the direction of the area to be machined. Areas to be machined satisfying the machining mode in finish machining are checked with respect to every conceivable tool direction in which the tool is to be moved. This check is performed for every sort of tolerance. The check is processed by use of the knowledge of machining, for example, "under the condition of a right angle, if a surface to be machined is opposite to a tool, and if another surface to be machined can be machined by the side of the tool, it is possible to machine the other surface to be machined", and so on.

By performing such processing, if it can be verified that there is a process plan satisfying all the machining modes in a finish machining process, the process plan is regarded as a desired process plan. Although this process plan does not take account of a disposition plane of a fixture and therefore is not perfect, since the machining attitude and the areas to be machined under the attitude have been already decided, the disposition plane of the fixture can be decided comparatively easily. For example, a production designer can input the disposition plane of the fixture by selecting a suitable fixture from a fixture data base while displaying the attitude of a blank on a machining device and the area which can be machined under the attitude on a display, and can confirm the display. The design of the fixture is performed for every machining attitude in the process plan.

By checking the possibility of machining again in consideration of the interference of the fixture on the basis of the shape and position information of the fixture, an efficient process plan can be decided.

In the case of a rough machining mode, a process plan is checked similarly to that in a finish machining mode, so that a final process plan is decided. The difference between the rough machining mode and the finish machining mode resides in that it is unnecessary in this step (e.g., the rough machining mode) to consider restrictions between areas to be machined in machining for the sake of realizing parts accuracy. Instead of considering parts accuracy, processing can be performed taking account the shortening o machining time.

In the above-described embodiment, shape (e.g., face, edge, point), accuracy information, and machining shaped elements to be used in the machining operation and which are shown, for example, in the Table above, expressing characteristics of the areas of parts to be machined are inputted as a parts model. It is judged from this parts model and the machine tool data base whether the areas to be machined require only a rough machining or both rough and finish machining. For the areas to be machined classified into the finish machining (i.e., identified as requiring a finish machining operation) and assigned a tolerance, the restrictions of the attitude between the areas to be machined in machining are decided based on the parts model and the machine tool data base used. In order to judge whether the areas to be machined of parts can be machined or not, the possibility of machining for every area to be machined is investigated with respect to every direction of a tool to be used.

Although the selection of a horizontal machining center has been described in this embodiment, the present invention is not to be limited thereto, and the present invention is applicable, for example, to a vertical machining center, a lathe, an electric spark machining device, etc., if the knowledge or data as to a method for checking a machining reference surface, a machining mode and the possibility of machining take into consideration the motion of the machine.

Further, while a system for realizing a fixture design by conversational processing by a production designer has been described in this embodiment, since areas which can be machined have been decided based on a machining attitude and the machining reference surface, or a tolerance reference surface and a machining attitude, it is possible to decide the design automatically by a computer by using this data.

As was described above, according to the present invention, a computer-aided process design support system comprises a processing section or portion for deciding a machining device, a machining mode and a machining reference surface on the basis of a parts model of parts to be machined and a data base for production, a processing section for forming and verifying a process plan based on the output of the processing section for deciding a machining device, and a fixture processing section, whereby it is made possible to perform the computer processing of a process plan and a fixture plan. Accordingly, the system provides ensures that a correct and efficient process working design can be realized in comparison with a conventional system in which process and fixture plans have been decided with a conversational manual system by a production designer.

What is claimed is:

1. A computer-aided automatic processing system for creating processes for machining of parts, comprising:

part input means for performing input of a part model, said part input means inputting information as to shape and accuracy as said part model;

process plan processing means, responsive to an input from said part input means, for processing a process plan;

data base means, coupled to said process plan processing means, for storing data on a plurality of machining devices, machine tools, and fixtures for the machine tools, wherein said process plan processing means includes means for selecting a machining device, means for selecting a machining reference surface based on said part model, means for determining a machining mode based n said part model and said data base means for a selected machining device, and means for drafting and verifying a process plan based on outputs from said machining device selecting means, said machining reference surface selecting means, and said machining mode determining means; and means coupled to said process plan processing means for processing a fixture plan for each of said machine tools and for each machining attitude, wherein said process plan processing means selects a machine device on the basis of the part model inputted by said part input means, and the data base for the machine tools, and wherein said process plan processing means includes means for restricting a machining attitude based on information on said machining device and said part model, said machining attitude representing an attitude of a blank relative to said machining device and said machining attitude being determined after verifying whether areas of all parts can be machined under a candidate machining attitude.

2. The system according to claim 1, wherein said machining mode deciding means includes means for deciding restrictive conditions between areas to be machined during machining based on said data base means and information on parts accuracy.

3. The system according to claim 1, wherein said parts input means inputs information as to machining shape features, said machining shape features including at least one of a pocket, a face, a hole, a groove, and a step.

4. The system according to claim 1, wherein said fixture plan processing means includes means for designing a fixture plan for the finish machining process and the rough machining process, and wherein a machining order is decided with said fixture plan in said finish machining process.

5. The system according to claim 1, further comprising display means, fixture database means, and means for inputting a disposition plane of a fixture by selecting a fixture from said fixture data base means while displaying the attitude of a blank on a machining device and the area which can be machined under the attitude on said display means.

6. The system according to claim 1, further comprising means for terminating operations of said system when no machining device is selected by said machining device selecting means.

7. The system according to claim 1, wherein said data base means comprises a memory storing data on a plurality of machining devices, machine tools, and a special machining tool data base.

8. The system according to claim 1, wherein said machining mode deciding means includes means for comparing a tolerance of the parts model with an accuracy of the respective machine tools.

9. The system according to claim 1, further comprising means for deciding whether all machining regions of said parts model can be machined with a first machine tool, said machine device selecting means selecting a second machine tool when all of said machining regions cannot be machined as determined by said machining region deciding means, said machining region deciding means verifying whether areas of all parts can be machined with the second machine tool.

10. The system according to claim 1, further comprising display means, wherein said parts input means comprises a solid modeller for generating a parts figures on said display means.

11. The system according to claim 1, wherein said machining device selecting means selects a machining device to be used based on the schematic shape of said parts model inputted by said parts input means.

12. The system according to claim 1, wherein said machining mode comprises at least one of a rough machining mode and a finish machining mode.

13. The system according to claim 1, wherein said fixture plan includes design of a fixture designated for a respective mode, wherein said fixture comprises a device for holding a workpiece on said machining device.

14. The system according to claim 13, wherein said machining mode deciding means includes means for determining said machining mode by comparing a tolerance of the part with accuracy of said machine tools, an accuracy of each machine tool being defined according to the kinds of tolerance, a rotation of the machining device, and positioning of said workpiece on said machining device.

15. The system according to claim 1, wherein said data base means stores values of accuracy of the respective machine tools.

16. A computer-aided automatic processing system according to claim 1, wherein said machining attitude is determined after verifying whether areas of all parts can be machined under said candidate machining attitude and all desired ones of said machining modes.

17. A computer-aided automatic processing system according to claim 1, wherein said machining device selecting means includes means for considering a plurality of candidate machining devices, and
wherein when no machining reference surface is selected by said machining reference surface selecting means and said candidate machining device considering means has considered all of said plurality of said candidate machining devices, operation of said computer-aided automatic processing system is terminated.

18. A computer-aided automatic processing system according to claim 1, wherein said machining device selecting means includes means for considering a plurality of candidate machining devices, said drafting and verifying means including means for determining whether a machining region is impossible to machine,
wherein when a machining region is determined by said drafting and verifying means to be impossible to machine and when no machining reference surface is selected by said machining reference surface selecting means and all of a plurality of candidate machining devices have been considered, operation of said computer-aided automatic processing system is terminated.

19. A computer-aided automatic processing system according to claim 1, further comprising means for determining whether a candidate machining region can be machined based on an output from said machining mode determining means,
said machining device selecting means including means for considering a plurality of candidate machining devices,
wherein when said candidate machining region determining means determines that at least one machining region is unable to be machined with a first candidate machining device of said plurality of candidate machining devices, said machine device selecting means selects a second candidate machining device of said plurality of candidate machining devices.

20. A method of creating processes for machining of parts, comprising:
performing input of a part model, said performing step comprising inputting information as to shape and accuracy;
storing data on a plurality of machining devices, machine tools, and fixtures for said machine tools;
processing a process plan in response to said input of said part model, said processing step including selecting a machining device, selecting a machining reference surface based on said part model, determining a machining mode based on said part model and said data stored for a selected machining device, and drafting and verifying a process plan based on said machine device selected step, said machining reference surface selecting step, and said machining mode determining step; and
processing a fixture plan for each of said machine tools and for each machining attitude,
wherein said processing step includes selecting a machining device on the basis of the part model inputted and the data stored for the machine tools, and
wherein said processing step includes restricting a machining attitude based on information of said machine device and said part model,
said machining attitude representing an attitude of a blank relative to said machining device and said machining attitude being determined after verifying whether areas of all parts can be machined under a candidate machining attitude.

* * * * *